SIGNAL TRANSLATING SYSTEM

Filed May 31, 1961 3 Sheets-Sheet 1

INVENTOR.
KERN K.N. CHANG
BY
Eugene M. Whitacre
Attorney

INVENTOR.
KERN K.N. CHANG
BY Eugene M. Whitacre
Attorney

SIGNAL TRANSLATING SYSTEM

Filed May 31, 1961

3 Sheets-Sheet 3

INVENTOR.
KERN K.N. CHANG
BY
Eugene M. Whitacre
Attorney

United States Patent Office 3,189,828
Patented June 15, 1965

3,189,828
SIGNAL TRANSLATING SYSTEM

Kern K. N. Chang, Princeton, N.J., assignor to Radio Corporation of America, a corporation of Delaware
Filed May 31, 1961, Ser. No. 124,253
18 Claims. (Cl. 325—451)

The present invention relates to high-frequency signal translating systems, and more particularly to high-frequency semi-conductor or solid-state amplifier and converter or modulator systems.

It is a primary object of the present invention to provide an improved semi-conductor signal translating system which is substantially nonreciprocal in operation at high frequencies and effectively utilizes presently available semi-conductor materials.

It is also an object of this invention to provide a signal amplifier and converter or modulator system which may effectively utilize the Hall-effect for signal translation in combination with semi-conductor diode signal amplification and/or conversion, with improved overall signal gain and nonreciprocal signal translation at relatively high frequencies.

It is a further and more specific object of this invention to provide a semi-conductor nonreciprocal signal amplifier and converter or modulator system having a combination Hall-effect and parametric or tunnel diode interaction for improved signal translation and/or modulation in radio, television, microwave radar and like signal translating systems, and in high-frequency switching systems.

In Hall-effect amplifiers, using semi-conductor samples or active elements with electrodal or contact elements thereon as Hall-effect units, high mobility materials have been considered necessary for appreciable signal gain. Presently available semi-conductor materials for such Hall-effect units do not generally have mobilities high enough for practical use. Thus practical Hall-effect semi-conductor amplifiers are presently difficult to construct, and are not available commercially. Furthermore, even if proper materials were available, another difficulty arises in that with high-mobility materials extremely low-impedance circuits must be used therewith. In fact, the required impedance may be so low that in some cases physical circuitry cannot be attained by any practical means.

To overcome the above difficulties in using the Hall-effect in signal amplifiers or translating systems, the Hall-effect is, in accordance with the invention, combined with parametric-diode or tunnel-diode action in a signal-translating system which achieves the following:

(1) Use of commercially available semi-conductor materials, although not necessarily of very high mobility, in the body or active element of the Hall-effect semi-conductor unit.

(2) Nonreciprocal action between the input and output circuits of the signal translating system, and a substantially constant resistance input circuit at relatively high frequencies.

(3) No fixed or D.-C. magnetic field is applied to the Hall-effect unit as is generally the case.

The Hall-effect signal translating or amplifier circuit in the system of the present invention is provided with a body or active element of semi-conductor material which is subjected to an R-F signal field along one of three substantially mutually perpendicular axes which constitute a conventional representation of a three-dimensional rectangular coordinate system. The body is generally a wafer or plate of rectangular configuration with said one of the above-referenced axes perpendicular to one face thereof. Four metal or like conductive electrodes or contacts are centrally located on and engage opposite side and end faces or edges in pairs, along two directions through the body corresponding to the remaining two of the three axes above referred to. An A.-C. or D.-C. bias potential from any suitable energy source is applied to one pair of electrodes, and a semi-conductor diode circuit is connected to the other pair of electrodes.

With this system, two basic signal translating diode circuits, one involving a shunt connection for the semi-conductor diode and the other involving a series connection for the semi-conductor diode, with the Hall-effect unit, have been evolved for use with Hall-effect semi-conductor units. Also the combined Hall-effect and parametric or tunnel diode interaction has been attained in both low-frequency circuits and high-frequency circuit structures or cavity elements effectively up to high kilomegacycle frequency ranges. Furthermore, effective means have been provided for combining the Hall-effect unit and semi-conductor diode structures for simplified operation at all frequencies.

Each system for signal translaion, whether for amplification or conversion or modulation, operates with three functions and on the three substantially mutually-perpendicular axes through the Hall-effect semi-conductor body or active element thereof. Thus (1) R-F modulation or signal input to the system is applied along the first axis or direction in the semi-conductor sample or body, preferably thorugh an R-F tuned circuit, the field of which is used to control the output Hall voltage generated along a second of the three axes or directions, between one pair of electrodes on the sample or body. (2) The energy supply for the signal translating system is applied along a third axis or direction through the sample or body of the Hall-effect unit, for example transversely, or edge-to-edge, across the sample or body which may be considered to be a rectangular wafer or plate. The energy source may provide alternating or direct current, or both, and if A.-C., the energy source provides a signal of a frequency which is modulated by the input signal through the Hall-effect and this is applied to the diode circuit. (3) The parametric or tunnel diode connected in the output circuit provides amplification or conversion. In the case of a parametric diode, a signal circuit, a pump circuit, and an idling circuit are connected therewith. If a tunnel diode is connected in the output circuit, suitable bias is provided to control its operating point for negative resistance control, whereas the junction or parametric diode operates as a variable reactance device. The pump and signal resonant circuits, as required for the parametric diode, may be omitted in the tunnel-diode circuit.

The A.-C. bias or energy source, which is provided for the Hall-effect unit may also be used as the pump signal source for the parametric diode circuit. Furthermore, a tunnel diode may be used as a supplement in the input or R-F modulation circuit, for increasing the Q thereof in low-frequency signal applications and for improving the Hall-effect efficiency. The tunnel diode here operates to improve the passive-circuit Q and not as an amplifier device, whereby substantially a constant input resistance can be maintained.

In any case, with a signal translating system embodying the invention, the input circuit and the signal source connected therewith are both isolated from the output circuit and the load or signal utilization means by the Hall-effect portion of the system, and the coupling or signal translation from the input circuit to the output circuit is effectively nonreciprocal. This is further assured in the converter or modulator embodiments of the system, where the output signal frequency is different from the input signal frequency.

A high-frequency build-in Hall-effect parametric or tunnel diode amplifier or converter may be provided in normal signal circuitry, as well as in cavity type circuits wherein an induced control or signal input magnetic field from an input cavity is circumferential in the semi-conductor body or disk and radial Hall currents are produced and amplified by way of a parametric or tunnel diode to an output cavity. The diode in either case may be formed on the Hall-effect body or active element which becomes the base element for the diode.

The foregoing and other forms of the invention, together with other objects and advantages of the invention, are described and pointed out hereinafter with reference to the accompanying drawings, for a further consideration of the invention, and its scope is pointed out in the appended claims.

Figures 1, 2:
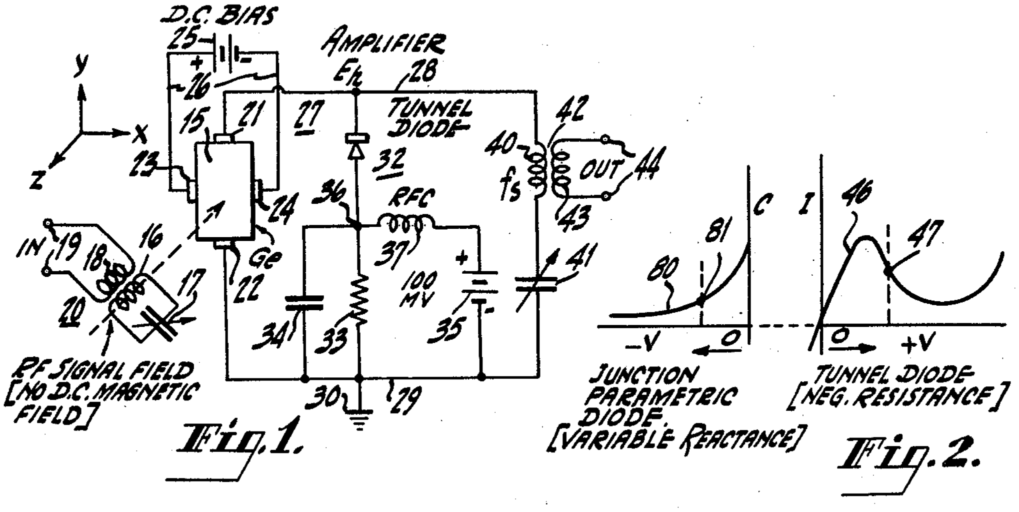
FIGURE 1 is a schematic circuit diagram of a semi-conductor signal amplifier embodying the invention and utilizing a tunnel diode.
FIGURE 2 is a graph showing curves illustrating control or amplifying characteristics of the semi-conductor diodes employed in signal translating systems embodying the invention.

Referring to FIGURE 1, 15 is a rectangular body of semi-conductor material, such as germanium for example, as the active element of a semi-conductor Hall-effect unit. The body is subjected to control and other electrical currents and magnetic fields along three substantially mutually-perpendicular axes X, Y and Z as indicated in the figure. The three axes represent the usual three dimensional rectangular coordinates, and along the Z-axis or perpendicular to the face of the active element or body 15 is applied the input control or R-F signal field indicated by the dotted arrowed line. This is produced by any suitable signal-activated coupling winding or coil such as the winding 16, which is tuned to resonance by a variable shunt capacitor 17. In the present example, the winding 16 is supplied with an applied signal through a primary or coupling winding 18 connected with input terminals 19 for any suitable signal source (not shown). It will be noted that the R-F signal field is the only magnetic field applied to the body or active element 15 of the Hall-effect semi-conductor unit. As indicated by the legend in the figure, no fixed or D.-C. magnetic field is applied, in accordance with the invention.

The R-F modulation or signal input is thus applied to the semi-conductor body or element 15 along the Z-axis or direction. Thus the R-F magnetic field of the input tuned circuit 20, comprising the inductor or winding 16 and the capacitor 17, is used to control the generation of the Hall-voltage in the body and in the present example along the Y-axis, that is longitudinally, between a pair of opposed end electrodes or contact elements 21–22 substantially centrally located on the ends of the body 15 as indicated. The energy supply or Hall-current for the generation of the Hall-voltage is provided along the X-axis or through the body 15 transversely, edge-to-edge, between two opposed edge contact elements or electrodes 23 and 24, likewise substantially centrally located. In the present example, this current is provided by a D.-C. bias or energy source, represented by a battery 25, connected between the terminals 23 and 24 through a suitable supply circuit 26.

The D.-C. bias or energy source provides a Hall current which flows, in the present example, from the electrode 23 transversely through the body 15 to the electrode 24. The Hall-effect involves the deflection of the current stream moving across the A.-C. signal field and thus creates a potential difference, across the other pair of electrodes 21–22, which depends upon the strength and direction of the signal or control magnetic field. Since this is the R-F signal field, the Hall-effect signal or voltage ($Eh$) which appears at the electrodes 21–22 is at the input signal frequency. The Hall signal or voltage ($Eh$) from the Hall-effect unit is transferred to an output or diode circuit 27 having a high signal-potential conductor 28 connected with the electrode 21 and a low signal-potential or ground conductor 29 connected with the electrode 22. The latter conductor may be connected to common or chassis ground 30 for the system.

A semi-conductor diode 32, which may be considered to be a tunnel diode in the present example, is connected in shunt relation to the diode or output circuit 27 between the high-potential lead or conductor 28 and the ground conductor 29, as shown. The diode is provided with a source of biasing potential, which is a resistor 33 in the present example, connected in series between the diode and ground conductor 29 and provided with a shunt signal bypass capacitor 34. The resistor receives potential-drop-producing current, or is energized, from a battery 35 connected between the ground lead 29 and a terminal 36, at the junction of the diode and the resistor 33, through an R-F choke coil 37.

The diode or output circuit 27 is also tuned to resonance at the signal frequency $f_s$ by suitable means such as the series tuning elements represented by an inductor 40 and a series variable tuning capacitor 41 therefor. In the present example the inductor is the primary winding of an output transformer 42 the secondary 43 of which is connected with signal output terminals 44 adapted for connection with any suitable utilization means (not shown).

Referring to FIGURE 2 along with FIGURE 1, the characteristic curve 46 is drawn between X and Y coordinates representing biasing voltage and diode current, respectively, for the tunnel diode 32. The voltage provided across the resistor 33 by the battery 35 or other suitable bias source is in the forward direction, as indicated, to cause the diode to operate in the negative resistance portion of its characteristic about a point such as that indicated at 47, representing a bias voltage of 100 mv., for example. Thus effective signal amplification in the diode or output circuit 27 results from the signal variation of the bias about the point 47 on the negative resistance portion of the curve. This in turn, results in variable cancellation or neutralization of the positive resistance in the circuit.

In accordance with the invention, it will be seen that the circuit of FIGURE 1, operates with the three functions and on the three mutually perpendicular axes through the Hall-effect semi-conductor body 15 as hereinbefore considered. The R-F signal modulation is applied to the body along the Z-axis or direction, through the face of the body, as a magnetic field from the input circuit inductor 16 when an input signal is applied to the terminals 19. The R-F magnetic field of the input tuned circuit is used to control the output Hall-voltage generated along the Y-axis or direction of the active element or body, or between the electrodes or contact elements 21 and 22, when energy or Hall-operating current is applied to the electrodes or contacts 23 and 24 on the X-axis. In the present example, the body of semi-conductor material 15 may be considered to be of germanium or other high-impedance material, although it may be of indium antimonide or other low-impedance material as will hereinafter be described. With a steady D.-C. bias or Hall-current flowing along the X-axis between the electrodes 23 and 24 from the energy supply circuit 26, the signal field causes a Hall-voltage at the electrodes or contacts 21 and 22 to be transferred to the output or diode circuit 27 for effective amplification by operation of the diode 32 as a variable negative-resistance device in the circuit. The diode circuit is tuned to signal resonance by the variable capacitor 41 in conjunction with the inductor 40, and the output signal is derived from the circuit through the secondary or output coupling winding 43 at the terminals 44. The output circuit is thus coupled to the Hall-effect unit along the Y-axis, or direction, of the active element or body.

By combining the semi-conductor Hall-effect with the semi-conductor diode action in the system, commercially available semi-conductor materials not necessarily of very high mobility may be used. Because of the Hall-effect modulation, the input circuit and signal source are isolated from the output circuit and load or signal utilization means, and the coupling of signal translation from input to output is effectively nonreciprocal. The input circuit resistance is effectively constant and the Q may be enhanced as will hereinafter appear. Furthermore no direct-current or fixed magnetic field is required.

With a bias signal or current applied to the Hall-effect body in the X-direction, the R-F magnetic field of the input tuned circuit, in the Z-direction, is used to control the output Hall-voltage generated in the Y-direction of the sample or body. This mode of operation may also be carried out when the bias or energy supply source is of the alternating-current rather than the direct-current type, as will be seen with reference to the circuit of FIGURE 3, to which attention is now directed, and in which like elements as in FIGURE 1, are designated by like reference numerals.

Figure 3:
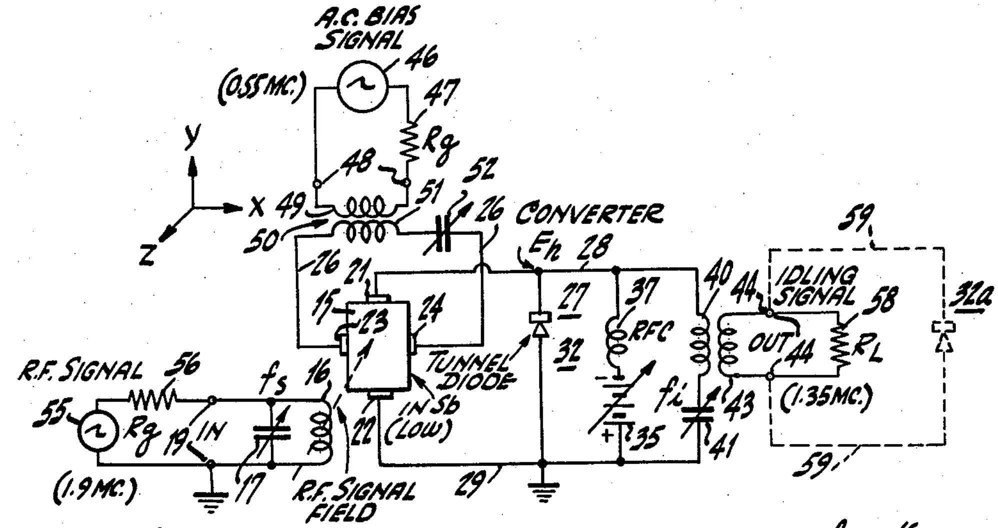
FIGURE 3 is a schematic circuit diagram of a semi-conductor signal converter embodying the invention, being a modification of the circuit of FIGURE 1 using a tunnel diode.

In the circuit of FIGURE 3, the Hall-effect body or sample 15 may be considered to be of rectangular shape, as in the preceding example, although it is not limited thereto. It is provided with a pair of end electrodes 21 and 22 along the Y-axis and a pair of transverse or side electrodes 23 and 24 along the X-axis. In the present system, the energy supply circuit 26, connected to the electrodes 23 and 24, is connected to receive an alternating-current bias signal from any suitable source such as a generator indicated at 46. In the present example this may be considered to be an alternating-current signal generator at a frequency of .55 mc., for example, and having an internal impedance indicated by the resistor 47. The generator or source is connected to supply terminals 48 on the primary 49 of an input coupling transformer 50, the secondary 51 of which is connected with the circuit 26 through a variable tuning capacitor 52, as indicated. The secondary 51 and the variable capacitor 52 variably tune the supply circuit 26 to resonance with the bias signal.

The input or R-F signal is applied to the input coupling winding 16 in shunt or parallel with the variable tuning capacitor 17 therefor as in the previous example, except that in the present example the circuit is connected directly with the input terminals 19, which in turn are connected with a source of R-F signals represented by a signal generator 55 operating at 1.9 mc., for example, and having internal impedance indicated by the series resistor 56.

In the output or diode circuit 27, represented by the conductors 28 and 29 connected respectively with the electrodes or contact elements 21 and 22, the tunnel diode 32 is connected in shunt relation to the circuit, as in the preceding example, between the leads or conductors 28 or 29. The operating bias is applied directly to the leads 28 and 29 from the battery or other suitable source 35 through the choke coil 37. The battery or source is adjusted to provide the proper operating point, such as the point 47 of FIGURE 2 as before, whereby the diode operates as a negative-resistance device in the circuit for affecting amplification of the signal.

In the present example, the signal in the output circuit 27 is an intermediate-frequency signal resulting from the interaction of the bias signal from the source 46 and the input signal from the source 55 in the Hall-effect translating unit as a modulation unit. This will be seen from the fact that the current flowing along the X-axis or through the electrodes 23 and 24, with the system energized, is an alternating current at the Hall-effect bias frequency, whereas the signal modulation along the Z-axis is at the R-F signal frequency. This results in an intermediate frequency at the circuit leads 28 and 29 which is 1.35 mc. in the present example. Therefore it is to this frequency that the output primary winding 40 is tuned by the variable capacitor 41. The final output signal at the terminals 44 may be applied to any utilization means connected therewith, such as the load means $R_L$ represented by the resistor 58 connected therewith.

In an amplifying system, as shown in FIGURE 3, the diode 32 was connected directly in the circuit 27 as shown and was also found to operate effectively when connected over and into the secondary circuit as indicated at 32*a*, through connection leads indicated at 59 with the terminals 44 and secondary 43. In this way the diode action as a negative-resistance was reflected back into the diode or output circuit 27 to effectively control it as hereinafter described and, therefore, to effect amplification of the signal. It is understood that biasing of the tunnel diode is provided, as in the diode circuit 27, to effect operation as referred to in connection with the characteristic curve 46 of FIGURE 2. Since the operation of the circuit of FIGURE 3 is otherwise the same as that of FIGURE 1, further description is believed to be unnecessary.

Figure 4:
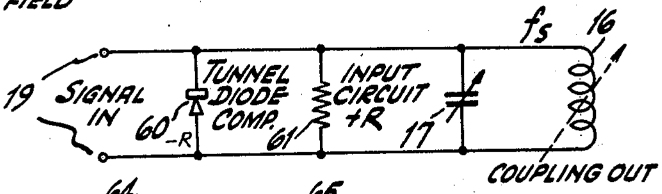
FIGURE 4 is a schematic circuit diagram showing a modification of a portion of the circuit of FIGURE 3 in accordance with the invention.
Figure 5:
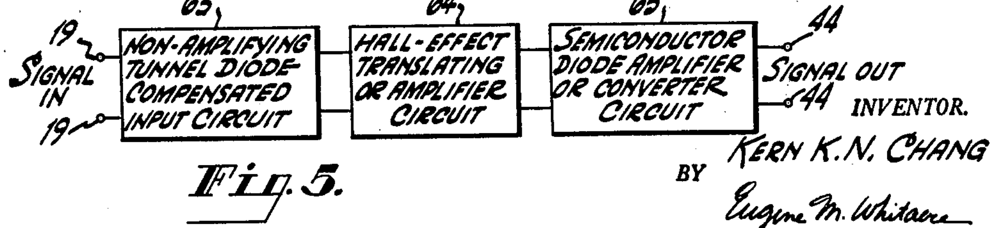
FIGURE 5 is a block circuit diagram of the circuit of FIGURE 3 modified in accordance with the circuit of FIGURE 4.

Referring now to FIGURES 4 and 5 along with FIGURE 3, and referring particularly to FIGURE 4, a second tunnel diode 60 may be used as a supplement in the signal input circuit connected with the terminals 19, and the tuning elements 16 and 17, for increasing the Q of the input circuit, and the Hall-effect efficiency by reason of an increase in the signal current applied to the coupling winding 16 and to the active element of the Hall-effect unit. The tunnel diode is operated to improve the passive-circuit Q and not as an amplifier. Thus a constant input-resistance input circuit can be maintained since the tunnel diode compensates as negative resistance is needed to counterbalance and equalize the positive input circuit resistance indicated by the resistor 61 in FIGURE 4.

This is particularly effective in low-frequency applications, and the overall circuit arrangement in any case may be represented as shown in FIGURE 5, wherein the non-amplifying tunnel-diode compensated input circuit of FIGURE 4, with input terminals 19, may be represented by the block 63 coupled to the Hall-effect signal translating or amplifier circuit 64 as the Hall-effect portion of the circuit, in accordance with the invention, as shown for example in FIGURES 1 and 3 as described. This in turn is coupled, as indicated, through the semi-conductor amplifier or converter circuit 65 and the signal output terminals 44, as described in connection with the diode circuit 27 of FIGURES 1 and 3 for example. FIGURE 5 represents the overall circuit arrangement providing for an amplifier and/or converter with combined Hall-effect and parametric or tunnel-diode interaction for signal translating systems as referred to hereinbefore.

Figure 6:
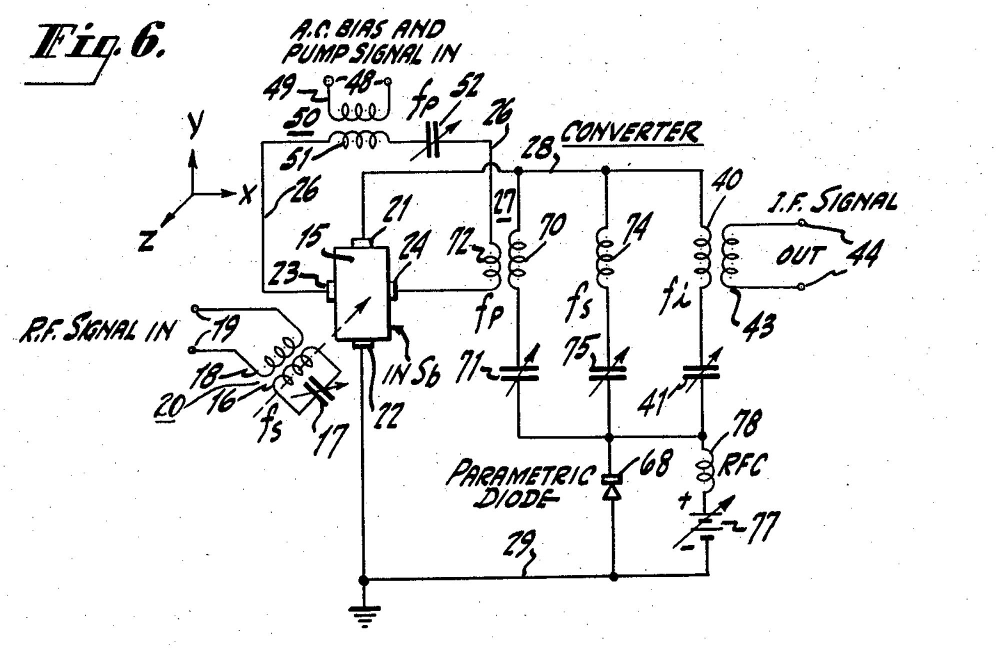
FIGURE 6 is a schematic circuit diagram of a semi-conductor converter embodying the invention and using a parametric diode.

Referring to FIGURE 6, along with FIGURE 3, like reference numerals refer to like circuits and elements in this modification of the converter circuit of FIGURE 3 which involves the use of a parametric diode 68 in the diode circuit 27 and the use of a low-impedance semi-conductor material for the Hall-effect body 15, such as low-impedance indium antimonide (InSb). Otherwise the two circuits are the same and operate to produce the same signal output or intermediate frequency as a result of applied A.-C. bias and R-F signal voltage or currents at the respective input terminals 48 and 19. Since the material is of relatively low impedance, the diode element, shown at 68, is connected in series with the circuit 27 and the tuning elements 40 and 41 therein. This series circuit may be traced from the electrode 21 on the Y-axis of the semi-conductor element 15 through the conductor 28, the output tuning inductor 40 and the series tuning capacitor 41, to the diode 68 and thence through the ground conductor 29 back to the Y-axis electrode 22 on the element 15. To complete the parametric diode circuitry, a signal circuit with circuit tuning elements therefor and a pump circuit with tuning elements therefor must be provided in the diode circuit 27, along with the idling or intermediate frequency output circuit tuning elements 40 and 41, the last being responsive to the output signal $f_i$, as indicated.

The pump circuit or circuit connection means includes a tuning inductor 70 and a series tuning capacitor therefor connected between the circuit conductors 28 and 29 through the diode 68 in a manner similar to and in parallel with the elements 40 and 41. The tuning elements 70 and 71 are tuned by the variable capacitor 71 to the pump signal for the parametric diode. The pump signal is conveniently supplied from the circuit 26 by the insertion of a coupling winding 72 for the inductor 70 connected serially therein as shown. Thus the input signal at the terminals 48 as applied to the input circuit 26, and to the Hall-effect current electrodes 23 and 24, is also applied in part to the coupling winding 72 and into the diode or secondary circuit through the inductor 70 and the pump signal circuit provided thereby with the tuning capacitor 71.

The diode 68 receives the pump signal and is likewise supplied with the applied signal through a similar tuned circuit comprising an inductor 74 connected with a variable tuning capacitor 75 between the conductors 28 and 29 through the diode 68 and in parallel with the other two sets of circuit tuning elements. At resonance, the signal at the frequency $f_s$ flows through the inductor 74 and the tuning capacitor 75 and is applied to the diode 68 for affecting the parametric diode action as a variable reactance device in the diode circuit, and effective signal amplification.

The operating point of the junction parametric diode 68 as a variable reactance device is adjusted by means of applied bias voltage derived from a suitable source, such as the bias battery 77, through the R-F choke coil 78 connected serially therewith across or in shunt with the diode. It will be noted in this case that the diode is reverse-biased for parametric diode action as a variable reactance device. Its operation is represented by the curve 80 in FIGURE 2, plotted between X and Y coordinates representing negative bias voltage and diode capacitance, respectively, as indicated in the figure. The diode is biased to operate about a point 81 on the response curve 80. It may thus respond to applied signals and effectively vary the capacitance, and the parametric diode or mixing action, for signal amplification in the diode circuit in response to applied signals. The latter are derived from the Hall-effect unit as described in the operation of FIGURE 3, for example.

The converter circuit of FIGURE 6 may be taken to represent an embodiment of the invention in which the Hall-effect signal translation unit includes an active semi-conductor element which is of relatively low-impedance whereby, in the output or diode circuit, the diode element is serially connected with the tuned circuit elements thereof, as distinguished from the shunt or parallel relation thereto as shown and described in the circuit embodiments of FIGURES 1 and 3, for example.

Furthermore the converter circuit of FIGURE 6 may also be taken to represent an embodiment of the invention wherein a parametric diode is used in the diode or output circuit for signal translation, that is, signal amplification or conversion in the present example, and thus requires both a pump input signal and an applied R.-F. signal for its operation as a variable reactance device to produce the idling or intermediate frequency as described. Therefore, the parametric diode circuit may generally include three tuned circuits as shown in FIGURE 6, for example, and with the pump signal provided by the A.-C. bias supply as used. Otherwise a separate pump signal input to the diode circuit is required. This would be the case, for example, if a D.-C. Hall-effect bias is provided on the semi-conductor active element, as in FIGURE 1 for example.

Figure 7:
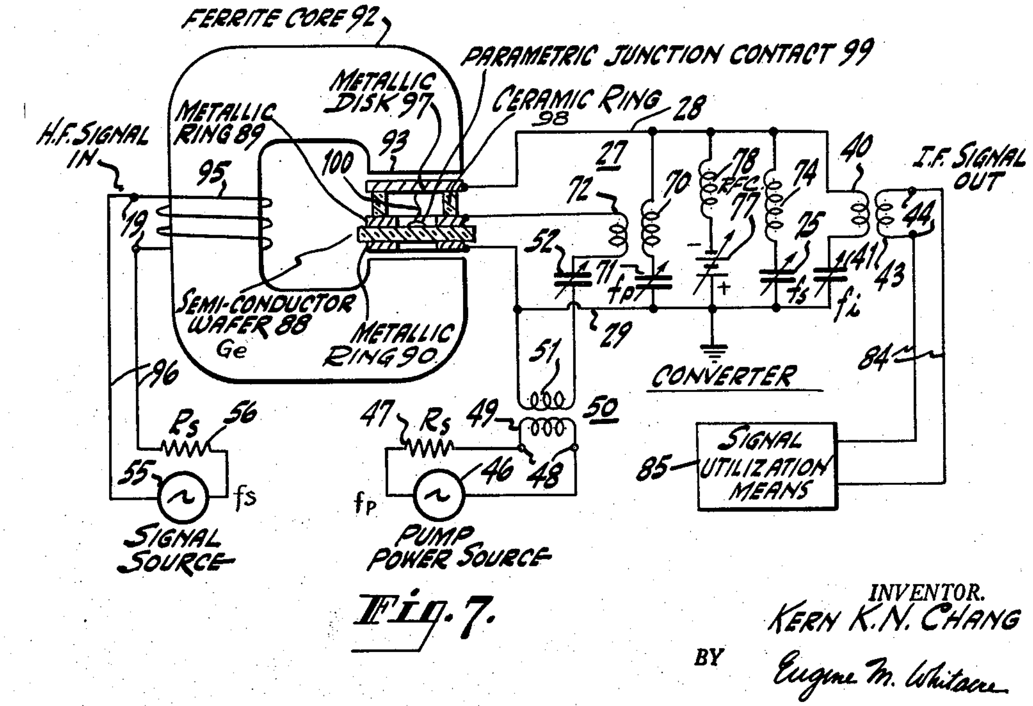
FIGURE 7 is a schematic circuit diagram of a semi-conductor converter of the type shown in FIGURE 6, with a modification of the elements to combine the Hall-effect unit and parametric diode in a structure shown partly in section and on a greatly enlarged scale.

In a converter circuit like that of FIGURE 6 for example, the parametric diode may not only be connected in parallel or shunt relation to the diode or output circuit as above referred to but, in accordance with the invention, it may be combined with the Hall-effect unit. The active semi-conductor element of the Hall-effect amplifier or translating circuit is made to provide the base element for a parametric or tunnel diode junction which is connected in the output or diode circuit. Thus the circuit of FIGURE 6 may be modified for this purpose, in accordance with the invention, as shown in FIGURE 7 to which attention is now directed along with FIGURE 6, as the overall operation and resultant signal translation and amplification is substantially the same in each case. Like reference numerals refer to like circuits and elements in this and the preceding figures.

In the system of FIGURE 7 as in that of FIGURE 6, the diode or output circuit 27 is provided with two conductors 28 and 29 between which are connected the three tuned circuits comprising the elements 70–71 for the pump signal, the elements 74–75 for the applied signal and the elements 40–41 for the intermediate-frequency or idling signal. The output signal at the intermediate or idling frequency is derived from the output terminals 44 and applied through a supply circuit 84 to any suitable utilization means indicated at 85. The diode element of the output circuit is connected in shunt relation to the circuit 27 as will hereinafter appear, in connection with the conductors 28 and 29, and receives biasing potential from the source 77 which is connected in the present example, serially with the R.-F. choke coil 78 between the conductors 28 and 29.

The combined Hall-effect signal-translating and semi-conductor diode signal-translating element of the system is relatively small in size and comprises the active element or semi-conductor body of the Hall-effect portion in the form of a semi-conductor disk or wafer 88 placed coaxially of and between two contacting flat metallic rings or contact elements 89 and 90, which in the drawing are the upper and lower rings respectively. These may be as small as ⅛″ in diameter in the present structure. The upper ring 89 is connected through the pump-signal coupling winding 72 and the variable tuning capacitor 52 with one side of the secondary winding 51 of the pump signal and bias signal input transformer 50. The other side of the winding 51 is connected with the ground lead or conductor 29 for the diode circuit and with the other or lower metallic ring or contact element 90. Thus the elements 89 and 90 correspond to the electrodes or contact elements 24 and 23 respectively of the circuit of FIGURE 6, for applying an A.-C. bias signal across the Hall-effect element or body 88 in what may be considered to be the X-axis or direction.

In the circuit of FIGURE 7, a ferrite or like torroidal-shaped core 92 is used as a medium to transmit the control magnetic field to the semi-conductor Hall-effect body or element 88 which is located in a relatively narrow air gap in the core, or between poles 93 and 94 formed by the air gap, so that the magnetic flux flows transversely through the sample or body 88 when a control signal is applied to an input winding 95 surrounding the core and connected with the input terminals 19. The latter are shown connected with the R.-F. signal source 55 and its series internal resistance 56 through supply leads 96 similar to the circuit of FIGURE 3. Likewise the A.-C. bias signal and pump signal is provided in the present example from the pump power source 46. This is connected, as before, through its internal resistance 47 with the terminals 48 for the primary winding 49 of the A.-C. bias and pump signal input transformer 50 and for the same purpose as described in connection with the circuit of FIGURE 3. However, in this case, as in the circuit of FIGURE 6, a portion of the energy from the source 46 is directed into the diode circuit through the coupling winding 72 and the pump signal circuit tuning inductor 70.

The parametric junction diode, per se, for the diode circuit 27 is effectively connected between the conductors 28 and 29 through the lower ring or contact element 90 and a circular metallic disk or plate 97 which forms a top closure for the combined diode and Hall-effect unit. The disk 97 is separated from the upper metallic contact or ring 89 and spaced therefrom by a ceramic or other suitable insulating ring element 98. The parametric-junction contact element 99 is located on the upper surface (as viewed in the drawing) of the wafer 88 and centrally thereof and may be of any suitable conducting material arranged to form a small bead on the surface of the semi-conductor wafer 88. This contact element is connected with the conductive disk or closure element 97 by a flexible conductor 100 as indicated. The Hall unit is then placed between the poles of and insulated from the ferrite core, although under certain circumstances the metallic ring 90 may be connected therewith when forming part of the common circuit ground connection for the system as in the present example.

With this arrangement, the circuit path through the parametric diode is from the circuit high signal-potential conductor 28 to the disk or closure element 97, through the conductor 100 and the junction contact 99 and thence through the parametric junction to the metallic ring or contact 90 and thence to the circuit ground conductor 29. In this circuit therefore, the ring or contact element 90 functions in much the same manner as the Hall electrode 22 in the circuit of FIGURE 6 for coupling to the diode circuit, and the diode contact 99 also functions as a Hall-effect electrode such as the electrode 21 of the circuit of FIGURE 6. Since the circuit of FIGURE 7 operates otherwise the same as that of FIGURE 6, further description is believed to be unnecessary except to note that, as above indicated, the entire structure may be relatively small in size.

Figures 8, 9, 10:
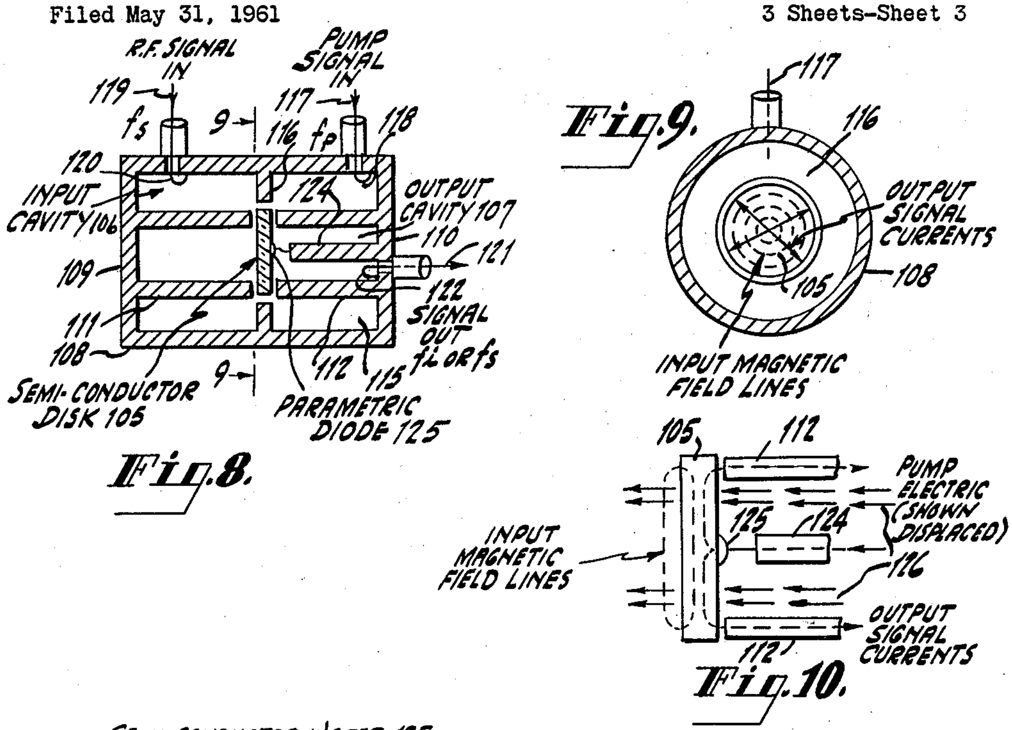
FIGURE 8 is a cross sectional view, in elevation and also on an enlarged scale, of a cavity-type high-frequency circuit structure with combined Hall-effect and parametric diode unit embodying the invention, as a further modification of the circuit of FIGURE 6, for either conversion or amplification.
FIGURE 9 is a cross-sectional end view of the cavity structure of FIGURE 8, taken on the section line 9—9, to further illustrate the construction and operation of the structure.
FIGURE 10 is a fragmentary representation of a portion of the structure of FIGURE 8 to better illustrate the magnetic flux and electronic current flow therein.

The combined Hall-effect and parametric or tunnel-diode interaction, as described for the various circuit modifications hereinbefore considered for the amplification of high-frequency signals, may be incorporated and used in connection with ultra high-frequency circuit structures such as cavity-type circuits, as shown for example in FIGURES 8, 9 and 10, to which attention is now directed.

In this modification, the Hall-effect semi-conductor body 105, in the form of a small disk or wafer, is positioned between an input-signal cavity 106 and an output-signal cavity 107 in a relatively small high-frequency cavity structure comprising an outer cylindrical casing 108 closed at its ends by end walls 109 and 110. The cavity structure further includes an inner cylindrical wall 111 defining the inner boundary of the input cavity 106 and standing in opposed end-to-end relation, on one side of the semiconductor disk 105, to a similar inner cylindrical wall 112 on the other side. The inner wall 111 adjoins the closed end 109 of the casing, while the inner wall 112 joins the opposite end wall 110 thereby defining the output cavity 110 and the pump signal cavity 115. An inner ring-like barrier or wall 116 joining the outer wall 108 and terminating short of the semiconductor disk 105 provides an intermediate barrier or wall between the input cavity 106 and the pump-signal cavity 115. Pump signals are applied to the cavity 115 through a shielded input conductor 117 and internal loop coupling element 118. Likewise the R–F input signal is applied to the input cavity 106 through a shielded input conductor 119 in connection with an internal coupling loop 120. The output signal is derived from the structure through a shielded output conductor 121 in connection with an internal coupling loop 122. A central conductor element or rod 124 extending from the wall 110 centrally of the chamber or cavity 107 provides a center conductor which is connected with the parametric diode 125 formed, as described in connection with the circuit of FIGURE 7, on the body or disk 105.

Referring particularly to the schematic fragmentary representation in FIGURE 10 of the structure of FIGURES 8 and 9, along with said figures, the system shown operates as a converter to provide an output signal at the circuit connection 121 which may be either the idling, or intermediate frequency, or the signal frequency in response to applied R–F signals at the input circuit connection 119 when a pump signal is applied to the input circuit connection 117. Because of the coaxial close coupling arrangement of the input and output cavities with respect to the combined parametric diode and Hall-effect element, the signal or control magnetic field on the Z-axis is circular in the body or disk 105, as indicated in FIGURES 9 and 10, while the pump electric field 126 on the X-axis is normal to the face of the disk 105. This field, as is understood, is shown displaced from its normal flow path through the circular inner walls 112 and 111 of the structure in order to show the output signal current flow therein. A radial Hall-current on the Y-axis is thus produced and amplified by way of the parametric diode action to the output cavity 107.

Figure 11:
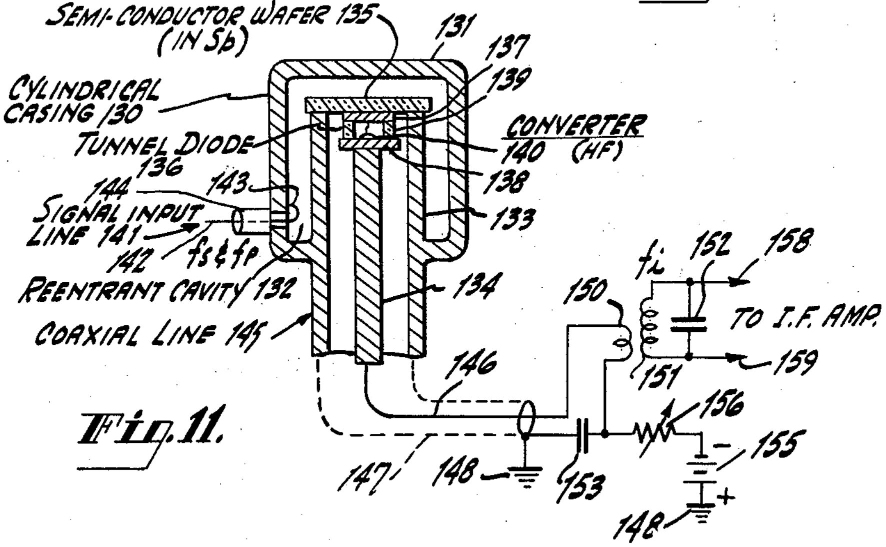
FIGURE 11 is a cross-sectional view, in elevation and on an enlarged scale, of a cavity circuit structure for use with and to form part of a coaxial line, and utilizing a tunnel diode as the operative element therein.

Other high-frequency circuit structures embodying the invention may be provided, for example, such as that shown in FIGURE 11 to which attention is now directed and in which the combined diode and Hall-effect unit is also employed, and in this case with a tunnel diode instead of a parametric diode.

This cavity structure, in the form of a coaxial conductor, comprises an outer cylindrical casing 130 having a closed end 131 and containing a reentrant cavity 132 surrounding a cylindrical coaxial outer conductor element 133 and a central inner conductor element 134. The outer conductor element 133 is terminated short of the outer wall 131 and is closed by a circular Hall-effect semi-conductor wafer or plate 135. Between the wafer 135 and the inner end of the inner conductor 124 is a tunnel diode 136. The diode structure includes a conductive disk 137 in contact with the inner face of the wafer 135. A semi-conductor base element 138 for the tunnel diode 135 in the form of a disk is mounted on and in contact with the inner end of the conductor 134, and the intervening space between the diode base element 138 and the conductive plate or disk 137 is closed by a ceramic or insulating spacing ring 139. The diode conductive element 140 on the inner face of the diode base 138 is connected with the conductive plate 137. This represents any suitable form of tunnel diode structure adapted to be interposed between the inner and outer conductors of the line structure through the Hall-effect semi-conductor element or body 135.

Signal input to this structure is through a suitable signal input line 141 comprising an inner conductor 142 connected with an inner coupling loop 143 in the cavity 132, and an outer shield conductor 144 connected with the casing 130.

The inner and outer conductor elements 134 and 133 serve to provide a coaxial line 145 outside the cavity section which may be connected with a common form of coaxial output line comprising an inner conductor 146 and an outer shield conductor 147. Therefore the inner conductor 146 is connected with the inner conductor element 134 as indicated, and the outer shield conductor 147 for the output line is connected with the outer conductor portion of the line structure 145. The outer shield conductor 147, indicated in dotted lines, may be grounded to the system ground 148 as indicated, and may be coupled to utilization means through a tuned coupling transformer comprising a primary winding 150 with a secondary winding 151 coupled thereto and provided with a shunt tuning capacitor 152. The coupling winding or primary 150 is connected with the inner conductor 146 and with the outer conductor through a coupling capacitor 153, whereby a bias potential may be applied to the diode 136 through the line. For this purpose a source of bias potential, such as a battery 155, is connected to ground 148 and the outer conductor, on one side, and to the inner conductor 146 through a series control resistor 156 and the primary winding 150 as shown, the bias source 155 and the control resistor 156 thus being connected substantially in shunt relation to the capacitor 153.

When signals are applied to the input circuit connection or the line 141, the intermediate-frequency resulting therefrom may be derived at output circuit leads 158 and 159 connected with the secondary winding 151 which is tuned to the intermediate-frequency output signal. This signal results when the signal input to the structure contains both the pump signal and the main signal ($f_s$ and $f_p$) as indicated. The tunnel diode operates to control the negative resistance in the circuit structure as described hereinbefore. The semi-conductor Hall-effect element 135 is subjected to the A.-C. bias signal and the input signal by reason of the cavity structure to provide a signal or control magnetic field circumferentially in the wafer or body 135 and a pump-signal electric field, as described for the structure of FIGURES 8 and 9. The Hall-current thus set up in this semi-conductor wafer is modulated by the input signal to produce the Hall output voltage across the diode 136, which is then transferred to the output line with effective amplification resulting from the negative resistance action of the diode, as described hereinbefore in connection with FIGURE 2.

From the foregoing description it will be seen that, in accordance with the invention, effective signal translation with amplification and/or conversion may be attained with the combined Hall-effect and parametric or tunnel-diode interaction provided. The system is effective to overcome previous difficulties tending to prevent the effective use of the Hall-effect in amplifiers and converters. The combination of the Hall-effect with the parametric-diode or tunnel-diode action thus advantageously permits the use of commercially available semi-conductor material which may not have a high degree of mobility. The signal translation action is effectively nonreciprocal between the input and output circuits, and an improved and substantially constant resistance input circuit is attainable in accordance with the invention. No direct-current or fixed magnetic field is required for the present system. An effective three-terminal semi-conductor diode amplifier and converter may be provided as one form of the invention. Other forms useful for radio, television, phonograph amplifier, microwave radar receiver, and switching systems may be provided in accordance with the principles herein shown and described.

What is claimed is:

1. A semi-conductor nonreciprocal signal translating system comprising in combination, signal input circuit means, Hall-effect semi-conductor signal translating means magnetically coupled to said input circuit means along one of three substantially mutually-perpendicular axes, means for applying electrical energy to said Hall-effect signal translating means along a second one of said axes, semi-conductor diode signal-translating circuit means directly coupled in cascade with said Hall-effect means through and along a third one of said axes to provide in conjunction with said Hall-effect means an integrated four terminal network, and means for deriving an output signal from said semi-conductor diode circuit means at a predetermined frequency related to the frequency of an applied signal.

2. A semi-conductor nonreciprocal signal translating system as defined in claim 1, wherein the signal input circuit means includes a non-amplifying tunnel diode for circuit Q correction and enhanced Hall-effect efficiency.

3. A semi-conductor nonreciprocal signal translating system as defined in claim 1, wherein the signal input circuit means, Hall-effect semi-conductor signal translating means, semi-conductor diode signal-translating means and means for deriving said output signal are included coaxially in a common high-frequency cavity structure.

4. A semi-conductor nonreciprocal signal translating system comprising in combination, a signal input circuit, Hall-effect signal-translating means including a semi-conductor body magnetically coupled to said input circuit along one of three substantially mutually-perpendicular axes, means including a first pair of spaced opposed electrodes attached to said body for applying electrical energy thereto along a second one of said axes, a second pair of spaced opposed electrodes on said body along a third one of said axes, a semi-conductor diode signal-translating circuit direct current connected with said Hall-effect signal-translating means through said second pair of electrodes to provide in conjunction with said Hall-effect signal translating means an integrated four terminal network, and means for deriving an output signal from said semi-conductor diode circuit at a predetermined frequency related to the frequency of an applied signal.

5. A semi-conductor nonreciprocal signal translating system as defined in claim 4, wherein means are provided for applying a direct-current bias source of energy to said first pair of opposed electrodes for effecting an output signal at the applied signal frequency.

6. A semi-conductor nonreciprocal signal translating system as defined in claim 4, wherein means are provided for applying an alternating-current bias signal to said first pair of opposed electrodes, whereby the derived output signal is related to the applied signal frequency and the applied bias signal frequency as a resultant or intermediate frequency.

7. A semi-conductor nonreciprocal signal translating system as defined in claim 4, wherein the Hall-effect body of semi-conductor material provides a diode base element for a composite Hall-effect and diode structure in the semi-conductor diode signal-translating circuit.

8. A semi-conductor nonreciprocal signal translating system comprising in combination, a Hall-effect semi-conductor signal translating circuit including a body of semi-conductor material connected for receiving radio-frequency signal modulation magnetically and electrical bias and energy supply current conductively therethrough along two of three substantially mutually-perpendicular axes, a semi-conductor diode signal-translating circuit directly coupled in cascade connected with and through said body of semi-conductor material along the third of said axes for deriving Hall-effect output signals therefrom, means for operating said diode signal-translating circuit to effect amplification of said signals, and means for deriving said amplified output signals from said diode signal-translating circuit.

9. A semi-conductor nonreciprocal signal translating system as defined in claim 8, wherein the means for applying radio-frequency signal modulation to said semi-conductor body includes a non-amplifying tunnel-diode compensated input circuit, and wherein the semi-conductor diode signal translating circuit includes a second tunnel diode connected for signal amplification effect therein as a negative-resistance device.

10. A semi-conductor nonreciprocal signal translating system as defined in claim 8, wherein the semi-conductor diode signal translating circuit includes a parametric diode connected for effective signal amplification as a variable-resistance device.

11. A semi-conductor nonreciprocal signal translating system comprising in combination, a rectangular body of semi-conductor material having spaced electrodal edge contact elements thereon in opposed pairs along effectively transverse and longitudinal axes through said body, means for applying a variable magnetic field through said body along a third axis substantially mutually-perpendicular to said first two axes in response to an applied input radio-frequency signal, an electrical bias and energy supply circuit connected with one of said pairs of contact elements for applying a Hall-current therethrough along one of said transverse and longitudinal axes, a semi-conductor diode circuit direct current connected with the other of said pairs of opposed electrodes for deriving a Hall-effect signal therefrom along the other of said transverse and longitudinal axes at a frequency and amplitude determined by the frequency and amplitude of the applied signal and electrical bias and energy supply, means for operating said semi-conductor diode circuit to provide effective amplification of said derived Hall-effect signal, and means for deriving the amplified signal from said semi-conductor diode circuit at a frequency related to the applied signal and bias and energy supply frequencies.

12. A semi-conductor nonreciprocal signal translating system comprising in combination, a body of semi-conductor material having spaced electrodal surface contact elements thereon in opposed pairs along two different orthogonally-related axes in one plane, means for applying radio-frequency signal modulation to said system as a variable magnetic field through said body along a third axis normal to said plane, electrical energy and bias supply means connected with one of said pairs of contact elements for applying a Hall-current through said body along one of said two different axes, an output circuit connected with the other of said pairs of contact elements for deriving a Hall-effect voltage therefrom at a frequency and amplitude related to the signal amplitude and frequency, said output circuit including a pair of conductors connected one with each of said last named contact elements, a semi-conductor diode coupled to said output circuit for response to Hall-voltage variations between said conductors and effective signal amplification therein said semi-conductor diode providing in conjunction with said body of semi-conductor material an integrated four terminal network, and circuit tuning means connected between said conductors for deriving an output signal therefrom at a predetermined frequency related to said signal frequency.

13. A semi-conductor nonreciprocal signal translating system as defined in claim 12 wherein the semi-conductor diode is a parametric diode, and wherein means are provided in said output circuit for applying to said diode a pump signal and the input signal for deriving an output signal at an intermediate frequency.

14. A semi-conductor nonreciprocal signal translating system comprising in combination, Hall-effect semi-conductor signal-translating means including a high-frequency cavity structure and a body of semi-conductor material mounted therein, means for applying to said body radio-frequency signal modulation magnetically and electrical currents conductively along two different axes for Hall-effect signal translation, signal-translating circuit means in said structure including a semi-conductor diode connected to said body in cascade for providing an integrated four terminal network and four deriving Hall-effect output signals therefrom, and output cavity means coupled with said diode for deriving amplified output signals therefrom.

15. A semi-conductor nonreciprocal signal translating system as defined in claim 14, wherein the high-frequency cavity structure is of the reentrant-cavity type, and wherein the output cavity means is part of a coaxial line adapted for external coaxial-line connection.

16. A semi-conductor nonreciprocal signal translating system comprising in combination, Hall-effect semi-conductor signal-translating means including a cylindrical high-frequency cavity structure and a circular disk-like body of semi-conductor material mounted therein, means for applying to said body radio-frequency signal modulation magnetically and electrical currents conductively along two different axes for Hall-effect signal translation, signal-translating circuit means in said structure including a semi-conductor diode located centrally on and connected with said body for deriving Hall-effect output signals therefrom, and cylindrical output cavity means coupled with said diode for deriving amplified output signals therefrom.

17. A high frequency converter circuit comprising in combination, a cavity structure including first and second conductor elements in space relationship with one another along a common axis and having an outer casing partially surrounding said first conductor for containing a reentrant cavity, Hall-effect semi-conductor signal translating means including a circular body of semi-conductor material mounted on said first conductor element to form in conjunction with said first conductor element and with said casing said reentrant cavity, a tunnel diode mounted on said second conductor element in electrical contact with said body of semi-conductor material to provide in conjunction with said body of semi-conductor material an integrated structure, circuit means electrically connected to said casing for applying input signal including a control signal $f_s$ and a pump-signal $f_p$ whereby said cavity structure subjects said Hall-effect semi-conductor signal translating means to an alternating current bias and to said control signal to provide respectively, a pump-electric field and a control magnetic field perpendicular to each other, bias circuit means coupled to said first and second conductor for biasing said tunnel diode in the negative resistance region of its current-voltage characteristic, and output circuit means coupled to said first and second conductor for deriving amplified output signals having an intermediate frequency.

18. An ultra high frequency converter circuit comprising in combination, a Hall-effect body of semi-conductor material, a tunnel diode, means for mounting said Hall-effect body of semi-conductor material and said tunnel diode to provide an integrated structure, said mounting means including first and second coaxial conductors and a casing partially surrounding said first coaxial conductor, said casing being closed at one end to form a reentrant cavity in conjunction with said body of semiconductor material and said first coaxial conductor, said second conductor being in electrical contact with said tunnel diode, means in electrical contact with said casing for applying input signals to said cavity, said input signals including control signals having a frequency $f_s$ and pump-signals having a frequency $f_p$, said control signals providing a magnetic field in said Hall-effect body of semi-conductor material, said pump-signals providing a pump electric field perpendicularly to said magnetic field, the interaction of said fields producing Hall-effect signals at an intermediate frequency equal to the difference between said control and pump frequencies, means coupled between said first and second coaxial conductors for biasing said tunnel diode in the negative resistance region of its current-voltage characteristic, output means coupled between said first and second conductors for deriving output signals having said intermediate frequency, said output means including a resonant circuit tuned at said intermediate frequency.

References Cited by the Examiner

UNITED STATES PATENTS

| | | | |
|---|---|---|---|
| 2,772,360 | 11/56 | Shockley | 307—88.5 |
| 2,862,184 | 11/58 | Longini | 307—88.5 |
| 2,978,576 | 4/61 | Watters | 307—88.5 |

FOREIGN PATENTS

| | | |
|---|---|---|
| 1,241,491 | 8/60 | France. |

DAVID G. REDINBAUGH, *Primary Examiner.*

ROY LAKE, *Examiner.*